(12) United States Patent
Iacovoni et al.

(10) Patent No.: US 10,487,553 B2
(45) Date of Patent: Nov. 26, 2019

(54) ARTICULATING HINGE SYSTEM FOR INDEPENDENTLY OPENING AUTOMOTIVE DOORS

(71) Applicant: FORD GLOBAL TECHNOLOGIES, LLC, Dearborn, MI (US)

(72) Inventors: Donald P. Iacovoni, Plymouth, MI (US); Paul L. Heirtzler, Jr., Northville, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 174 days.

(21) Appl. No.: 15/341,553

(22) Filed: Nov. 2, 2016

(65) Prior Publication Data

US 2018/0119471 A1  May 3, 2018

(51) Int. Cl.
*E05D 15/56* (2006.01)
*B60J 5/04* (2006.01)
*E05F 15/603* (2015.01)
*E05D 3/02* (2006.01)

(52) U.S. Cl.
CPC ............ *E05D 15/56* (2013.01); *B60J 5/0479* (2013.01); *E05D 3/022* (2013.01); *E05F 15/603* (2015.01); *B60J 2005/0475* (2013.01)

(58) Field of Classification Search
CPC . B60J 5/0479; B60J 2005/0475; E05D 3/022; E05D 5/0207; E05D 15/56; E05D 15/58; E05D 2015/586
See application file for complete search history.

(56) References Cited

U.S. PATENT DOCUMENTS

| | | | | |
|---|---|---|---|---|
| 5,244,247 A | * | 9/1993 | Kuwabara | B60J 5/047 16/365 |
| 6,053,561 A | * | 4/2000 | Hojnowski | B60J 5/047 296/146.11 |
| 6,305,737 B1 | * | 10/2001 | Corder | B60J 5/0479 296/146.11 |
| 6,386,621 B1 | * | 5/2002 | Kozak | B60J 5/047 16/278 |
| 7,488,029 B2 | * | 2/2009 | Lechkun | B60J 5/0479 296/146.1 |
| 7,798,557 B2 | | 9/2010 | Elliott et al. | |
| 8,777,295 B2 | | 7/2014 | Charnesky | |
| 2003/0107237 A1 | * | 6/2003 | Brodt | B60J 5/0479 296/146.12 |
| 2009/0295187 A1 | * | 12/2009 | Ham | E05D 3/022 296/146.11 |

(Continued)

*Primary Examiner* — Catherine A Kelly
(74) *Attorney, Agent, or Firm* — Jason Rogers; Vichit Chea; King & Schickli, PLLC

(57) ABSTRACT

An automotive vehicle is provided having a body with an opening without a pillar. First and second doors cover the opening, and a translatable hinge, such as a gooseneck hinge, connects the first door to the vehicle. The hinge is adapted for moving the first door away from the second door, and then allowing the first door to pivot to an open position about a single pivot axis. A striker is adapted for allowing a latch for latching the first door to move along the striker in a latched condition during translation of the hinge, and may include an elongated, angled striker bar for permitting the first door to move both along and outboard of the vehicle body during the opening sequence.

17 Claims, 12 Drawing Sheets

(56) References Cited

U.S. PATENT DOCUMENTS

| | | | |
|---|---|---|---|
| 2012/0049577 A1* | 3/2012 | Thomas | B60J 5/0479 296/202 |
| 2012/0049579 A1* | 3/2012 | Konchan | B60J 5/0479 296/202 |
| 2017/0254132 A1* | 9/2017 | Stoof | B60J 10/86 |
| 2018/0050579 A1* | 2/2018 | Linden | B60J 5/0477 |

* cited by examiner

ARTICULATING HINGE SYSTEM FOR INDEPENDENTLY OPENING AUTOMOTIVE DOORS

TECHNICAL FIELD

This document relates generally to the motor vehicle field and, more particularly, to an articulating hinge system for independently opening automotive doors.

BACKGROUND

Automotive vehicles are often provided with multiple doors. Typically, a pair of adjacent doors on a common body side of a vehicle open rearward facing with respect to the vehicle. Such rearward facing adjacent doors are generally each mounted to an associated body pillar. Therefore, each door is provided with a corresponding door opening.

The openings for adjacent doors may be combined into a common "pillarless" door opening. To provide lateral support to the vehicle body, generally both front and rear doors interlock and collectively provide lateral structural support. Since both front and rear doors are pivotally connected to the vehicle body, the doors are typically provided such that a user must open a front door, before opening or closing the rear door.

A proposed solution is to use a linkage for moving one door away from the other as part of the opening sequence, as shown in commonly owned U.S. Pat. No. 7,488,029, the disclosure of which is incorporated herein by reference. While this arrangement solves the issue of requiring the front door to be opened before the rear door, the linkage presents a complicated arrangement requiring multiple pivot axes about which the associated door pivots during opening. This increases not only the complexity of manufacture, but also the resulting costs in terms of maintenance.

Accordingly, a need is identified for an arrangement that may allow for the selective opening of doors in a common opening that may provide the door with a single pivot axis, and which otherwise presents a simplified construction to facilitate ease of manufacture and enhanced reliability in use.

SUMMARY

In accordance with the purposes and benefits described herein, an automotive vehicle having a body with an opening without a pillar is disclosed. The vehicle comprises first and second doors for covering the opening, and a translatable hinge (such as a gooseneck hinge) for connecting the first door to the vehicle. The hinge is adapted for moving the first door away from the second door (and possibly outboard from the vehicle as well), and allows for the door to open by pivoting about only a single pivot axis.

In one embodiment, an actuator is provided for moving the translatable hinge in a linear path of travel, or alternatively in a non-linear (arcuate) path of travel. To ensure that the desired movement is reliably achieved, a spring may be provided for biasing the hinge toward a translated position. The first door may include at least one latch, and the vehicle may further include a striker for allowing the latch to move along the striker in a latched condition during translation of the hinge. The striker may comprise elongated striker bar for engaging the latch and angled for permitting the first door to move both along and outboard of the vehicle body.

In one particular embodiment, the first door includes an upper latch and a lower latch. In such case, the vehicle may further include an upper striker for allowing the upper latch to move along the upper striker in a latched condition during translation of the hinge, and a lower striker for engaging the lower latch (which may be automatically released prior to the door opening operation to allow the upper latch to translate in the latched condition as a result of movement of the translating hinge). The upper striker may comprise an elongated upper striker bar for engaging the upper latch, which may be angled outwardly for permitting the first door to move both along and outboard of the vehicle body.

According to a further aspect of the disclosure, an automotive vehicle having a body with an opening is disclosed. The vehicle comprises a first door for covering the opening, the first door including a latch. A translatable hinge is connected to the first door and the vehicle, and is adapted for moving the door relative to the opening. A striker is provided for allowing the latch to move along the striker in a latched condition during translation of the hinge.

In one embodiment, the vehicle further includes a second door for covering the opening, wherein the first door and the second door cooperate to close the opening when both the first door and the second door are in the closed position. The first door may be translatable relative to the vehicle on a fixed path of translation. The latch may translate along the striker such that the first door is translated from the vehicle to an intermediate position for providing clearance from the second door when in the closed position. The latch is detachable from the striker for pivoting the first door relative to the vehicle from the intermediate position to an open position of the first door.

In this or another embodiment, an actuator is provided for moving the translatable hinge along a linear or non-linear path of travel. A spring may also be provided for biasing the translatable hinge toward a translated position. The striker may comprise an elongated striker bar for engaging the latch. The striker bar may be angled for permitting the first door to move both along and outboard of the vehicle body. The translatable hinge may be adapted for moving such that the connected first door moves both outboard of the vehicle and away from the second door, and may include a single pivot axis.

A further aspect of the disclosure pertains to an automotive vehicle having a body with an opening without a pillar for occupant ingress and egress. The vehicle comprises a first door having a first end pivotally connected to the vehicle about an axis adjacent to a perimeter of a vehicle body opening, and a second end that extends to a central region of the opening in a closed position and that extends away from the opening in an open position. A second door includes a first end translatably connected to the vehicle adjacent to the perimeter of the opening spaced apart from the first door first end, and a second end translatably connected to the vehicle adjacent to the central region of the opening at a closed position. A fixed striker is connected to one of the central region of the opening and the perimeter of the opening spaced apart from the first door end. A latch is mounted to one of the second door first end and the second door second end for receiving the striker. Consequently, the first door and the second door cooperate to close the opening when both the first door and the second door are in the closed position. The second door is translatable relative to the vehicle on a fixed path of translation such that the latch translates along the fixed striker such that the second door first end and the second door second end are translated from the vehicle to an intermediate position for providing clearance from the first door when in the closed position. The latch is detachable from the fixed striker for pivoting the second door about the other of the second door first end and the second door second end relative to the vehicle from the intermediate position to an open position of the second door.

In one embodiment, the striker comprises an elongated striker bar for engaging the latch. The striker bar is angled for permitting the first door to move both along and outboard of the vehicle body. The second door may be associated with a translatable gooseneck hinge that provides the door with a single pivot axis. Upper and lower strikers may also be provided for associating with corresponding latches on the second door.

BRIEF DESCRIPTION OF THE DRAWING FIGURES

The accompanying drawing figures incorporated herein and forming a part of the specification, illustrate several aspects of an articulating hinge system for independently opening automotive doors and, together with the description, serve to explain certain principles thereof. In the drawing figures.

Figure 1:
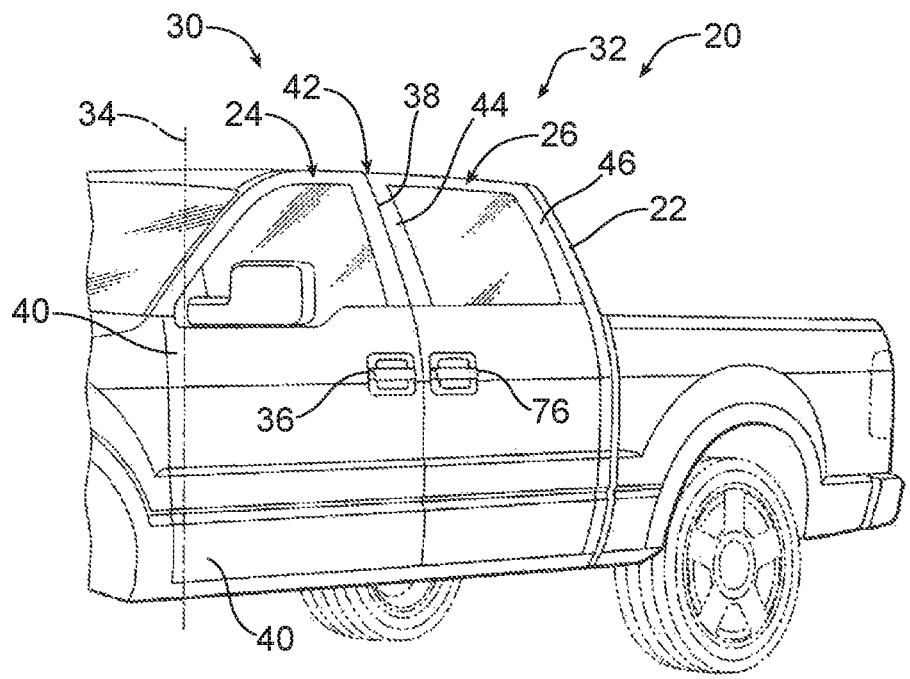
FIG. 1 is a partial perspective view of an automotive vehicle illustrated with a front door and a rear door in a closed position.

Reference will now be made in detail to the present preferred embodiments of an articulating hinge system for independently opening automotive doors, examples of which are illustrated in the accompanying drawing figures.

DETAILED DESCRIPTION

With reference now to FIGS. 1-4, an automotive vehicle 20 is illustrated. The automotive vehicle 20 is depicted as an extended cab pickup truck, however, any automotive vehicle is contemplated within the spirit and scope of the disclosure.

The vehicle 20 has a pair of doors on one lateral side of a vehicle body 22. The doors are referred to as a front door 24 and a rear door 26, for purpose of description of the embodiment of FIGS. 1-4. However, it is understood that the features of the front door 24 discussed herein may be incorporated into a rear door and the features of the rear door 26 discussed herein may be incorporated into a front door. Additionally, the features of either door 24, 26 may be incorporated into any door regardless of forward, rearward or lateral spatial relationship. For example, a pair of adjacent doors may be provided on a rear end of a vehicle, such as a sport utility vehicle, a cargo vehicle, or the like.

The vehicle body 22 includes a door opening 28, which is closed and sealed collectively by the front door 24 and the rear door 26. To facilitate occupant ingress and egress, the door opening 28 is a pillarless door opening, without a center pillar dividing a front row 30 and a rear row 32 of the passenger compartment. Without a center pillar, often referred to as a B-pillar, less obstacles are provided within the door opening 28 for ease in entering and exiting the vehicle 20. Additionally, it is typical for utilization of the second or rear row 32 for transporting objects other than occupants. Accordingly, it is common that the seats within the rear row 32 are collapsible for providing a compact area for transporting cargo. Without a center pillar, an enlarged door opening 28 is provided for loading and unloading of cargo within the passenger compartment.

The front door 24 is hinged to the vehicle proximate to a forward region of a perimeter of the door opening 28. The front door 24 is hinged to the vehicle body 22 about a generally vertical axis 34 so that the front door may open facing rearward from the closed position illustrated in FIGS. 1-4 to the open position illustrated in FIG. 5. The front door 24 may include a conventional latch for latching the door in the closed position. The front door 24 includes an exterior door handle 36 and an interior door handle for actuating the latch, which disengages a rear end 38 of the front door 24 from the vehicle body. Once unlatched, the rear end 38 of the front door 24 may be pivoted away from the vehicle body 22 as the front door 24 pivots about the first hinge axis 34 proximate to a front end 40 thereof.

The front door 24 and the rear door 26 collectively meet in a central region 42 of the door opening 28 for closing and sealing the door opening 28. The rear door 26 includes a front end 44 that engages the front door rear end 38 at the central region 42 of the door opening 28. The rear door 26 has a rear end 46 that engages the perimeter of the door opening 28 at a rearward region, commonly referred to as a C-pillar. The rear door 26 pivots about a generally vertical axis 48 for reaching the open position illustrated in FIGS. 3 and 4. Since the front door rear end 38 and the rear door front end 44 engage at the central region 42 of the door opening 28, an interference is provided preventing independent opening of the front and rear doors 24, 26 by single-axis pivoting only.

As illustrated in FIGS. 1-4, the rear door 26 is mounted to the vehicle body 22 for translation relative to the vehicle body for providing clearance between the rear door front end 44 and the front door rear end 38 so that the second or rear door 26 may be subsequently pivoted to the open position (such as using interior or exterior handles 76, 78). With reference to FIG. 1, the rear door 26 is illustrated in the closed position. Subsequently, the rear door 26 is translated to a first intermediate position illustrated in FIG. 2. In the intermediate position of the rear door 26, the rear door rear end 46 translates laterally outboard from the vehicle body 22 while the rear door front end 44 begins translation rearward and away from the front door rear end 40.

Figure 2:
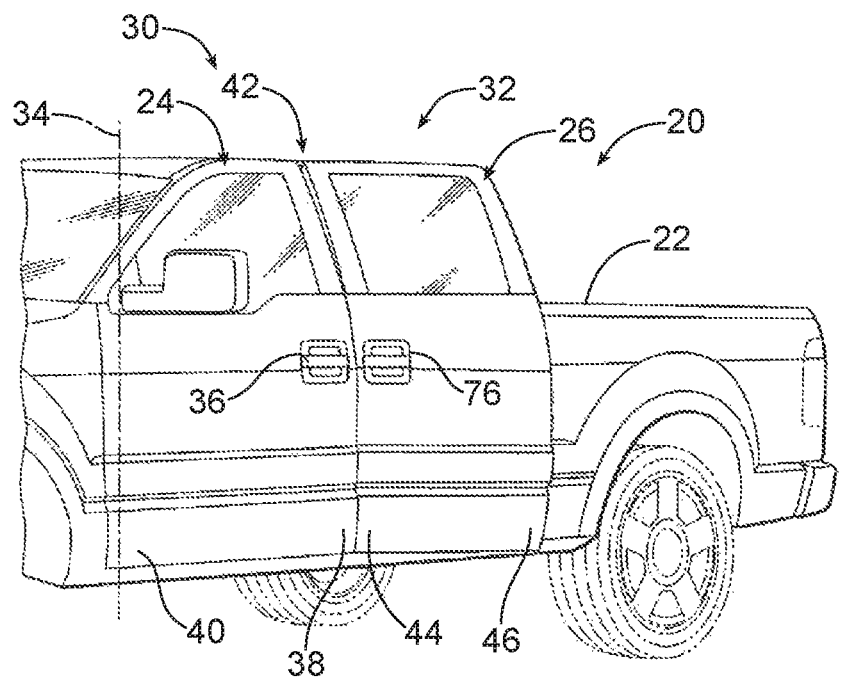
FIG. 2 is a partial perspective view of the automotive vehicle of FIG. 1, illustrated with the rear door in an intermediate position.
Figure 3:
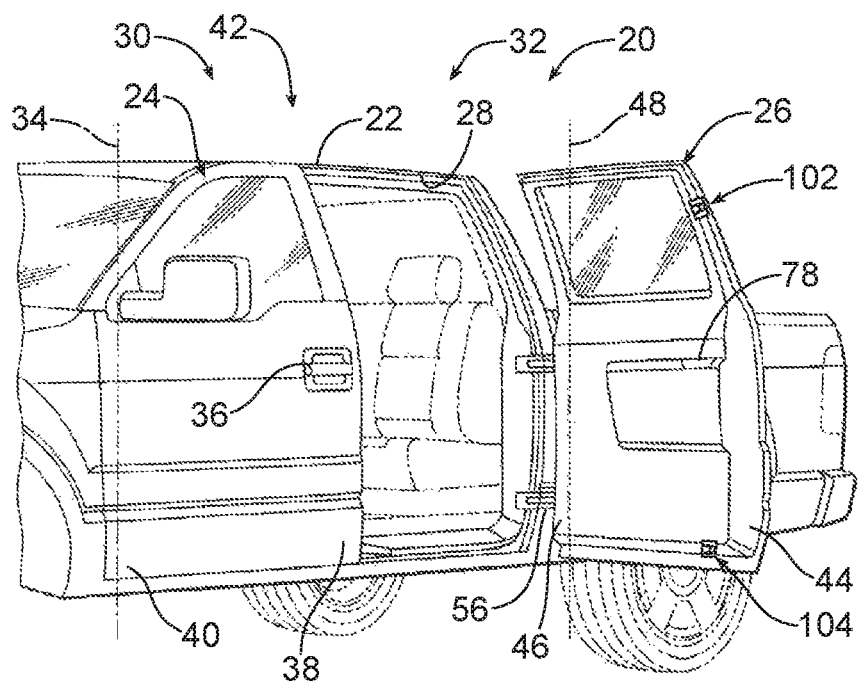
FIG. 3 is another partial perspective view of the automotive vehicle of FIG. 1, illustrated with the rear door in an open position.

Upon reaching the intermediate position illustrated in FIG. 2, the rear door 26 may be pivoted about the second hinge axis 48 to the open position illustrated in FIG. 3. Thus, the rear door 26 may be opened independent of the front door 24 for independent ingress and egress to the rear row 32. Likewise, the front door 24 may be opened independent of the rear door by merely pivoting the front door open. Additionally, both doors 24, 26 may be opened for maximizing the pillarless door opening 28 for ingress/egress and loading and unloading of cargo.

Figure 7:
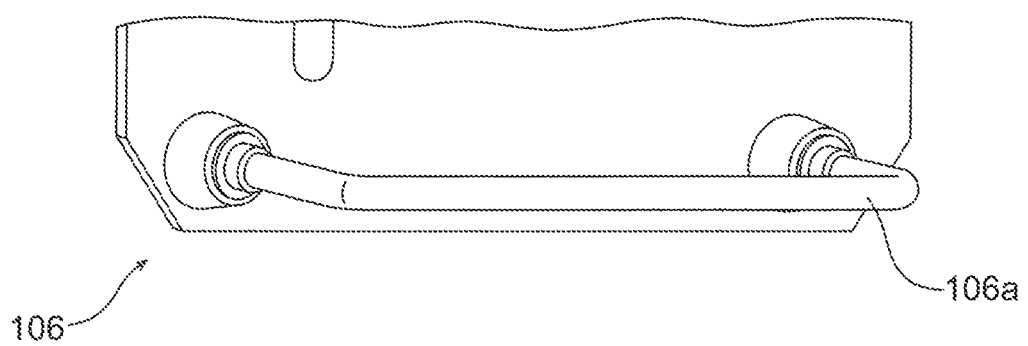
FIG. 7 is a front perspective view of a striker for use in connection with the latch of FIGS. 5 and 6 to allow for translation of the front or rear door associated with a translatable hinge.

In order to achieve the desired translation of the rear door 26, and according to one aspect of the disclosure, articulating hinge system 100 is provided. With reference to FIGS. 5-16, the system 100 may comprise at least one latch 102 designed to engage a corresponding striker 106 for latching the door, such as rear door 26, in place, while allowing for the door to translate during opening. In one embodiment, this is achieved by providing the striker 106 with an elongated striker bar 106a, as shown in FIG. 7, that as a result of a pivoting catch 102a is engaged in an associated receiver 102b of latch 102. Consequently, as can be appreciated from FIGS. 6 and 7, the latch 102 may translate a short distance in a travel direction D while remaining engaged with the associated striker 106 (such that striker bar 106a is received in receiver 102b and the door 26 is prevented from fully opening). Furthermore, as can be appreciated from FIGS. 8 and 9, the striker bar 106a may be arranged to gradually increase in angle in an outboard direction (that is, away from the body of the vehicle, such that the bar is closer at one connection leg than another), such as from the front to the rear of the vehicle 20 in the travel direction D, in order to allow the door 26 to achieve the position of FIG. 2 while remaining latched.

Figure 4:
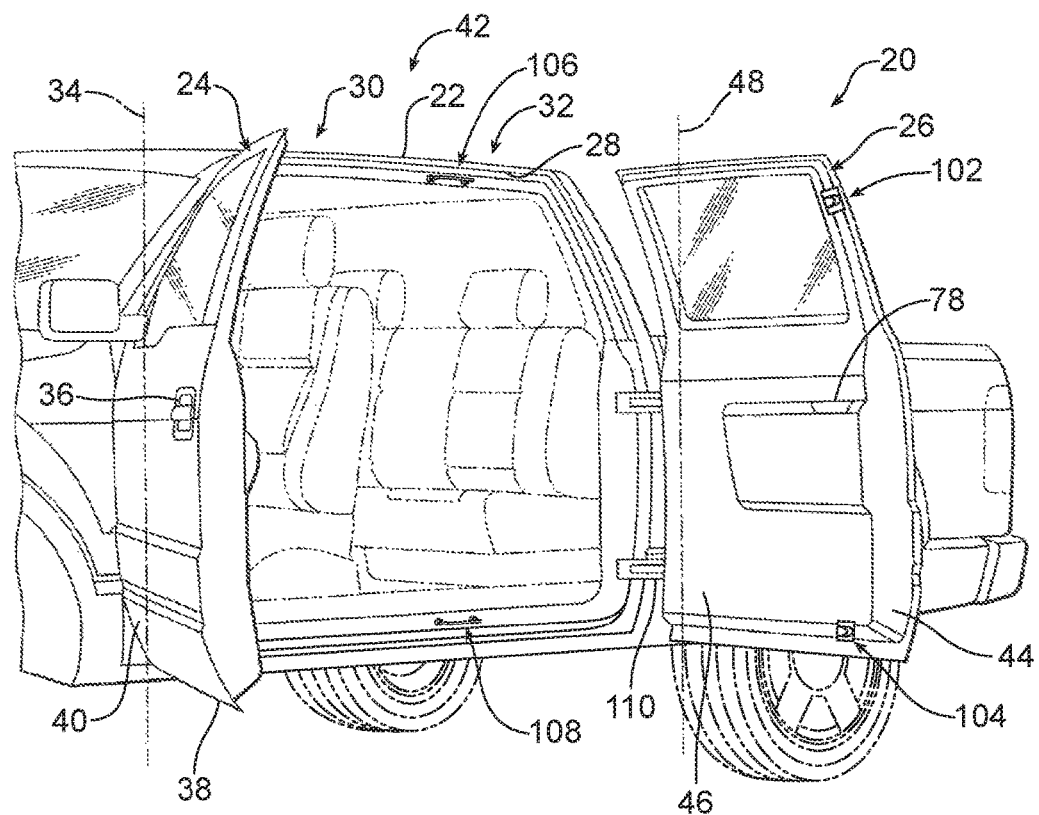
FIG. 4 is yet another partial perspective view of the automotive vehicle of FIG. 1, illustrated with the front door and the rear door in an open position.
Figure 5:
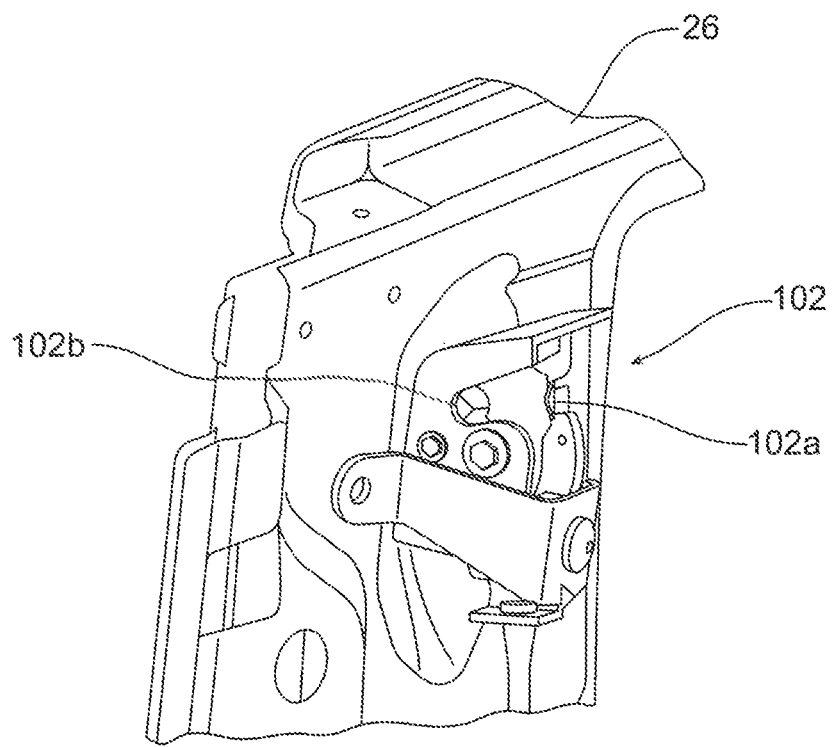
FIGS. 5 and 6 are front and rear views of a latch for securing and releasing one of the front or rear doors for opening.
Figure 6:
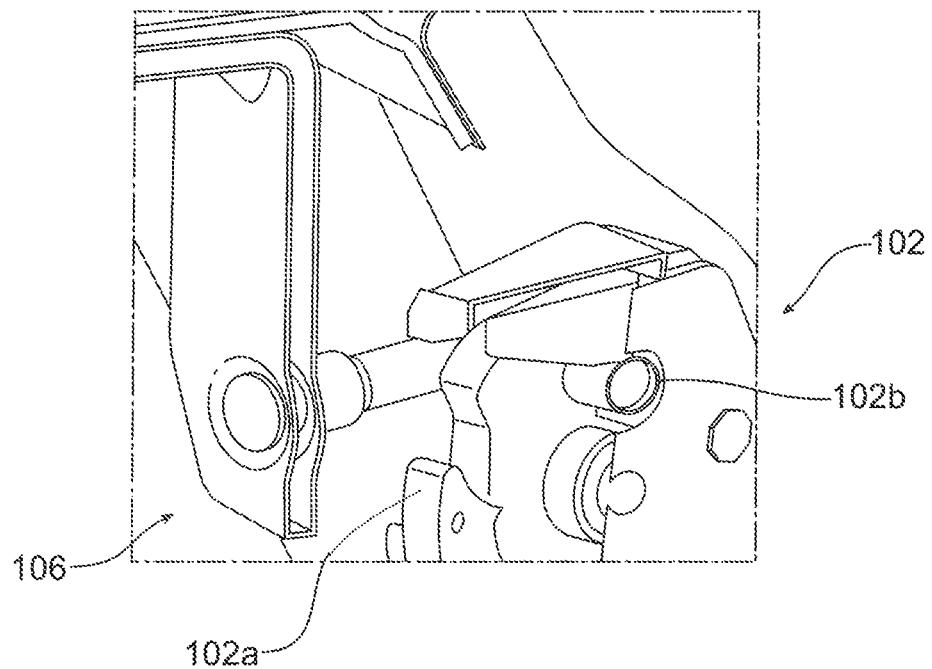

As indicated in FIG. 4, a second latch 104 may also be provided for engaging a second striker 108, such as along a lower portion of the vehicle 20 (see FIG. 4). The arrangement could be made similar to the above-described latch 102 and striker 106 combination, it may also be conventional, as illustrated. Striker 108 thus includes a striker bar (not shown, but see FIG. 7) oriented transverse to the travel direction D, and the latch 104 may include a corresponding catch (not shown, but see FIG. 6) for engaging and receiving the striker bar in a latched condition. In such case, and as outlined further in the description that follows, the lower latch 104 may be automatically released upon a door open signal being provided by an associated controller 200 (see FIG. 17), which allows for the latch 102 to move along the striker 106 as previously noted.

Figure 8:
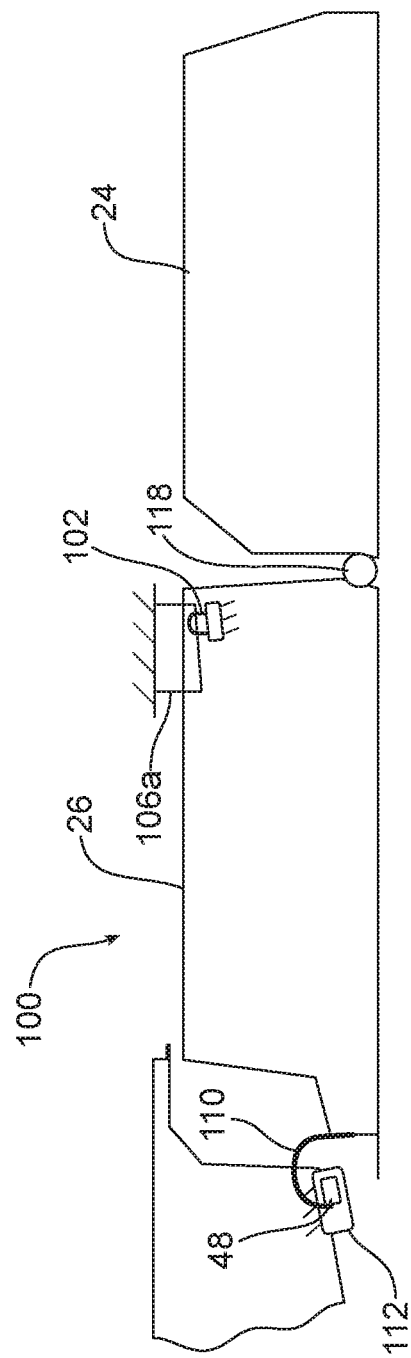
FIGS. 8-10 are schematic views showing the progression of the opening of a door associated with a translatable hinge.
Figure 9:
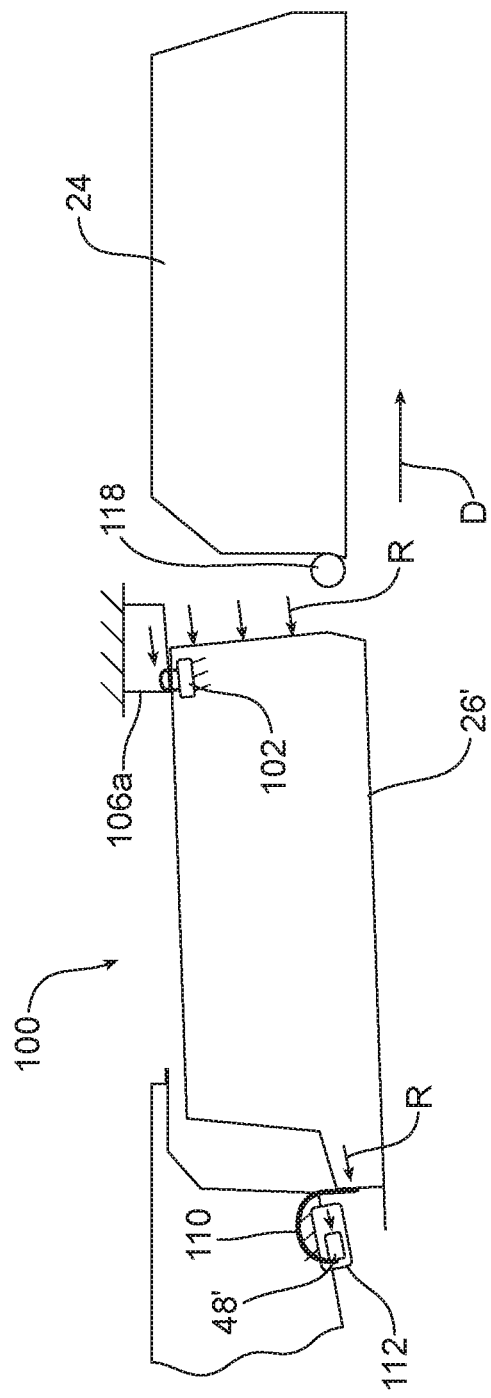
Figure 10:
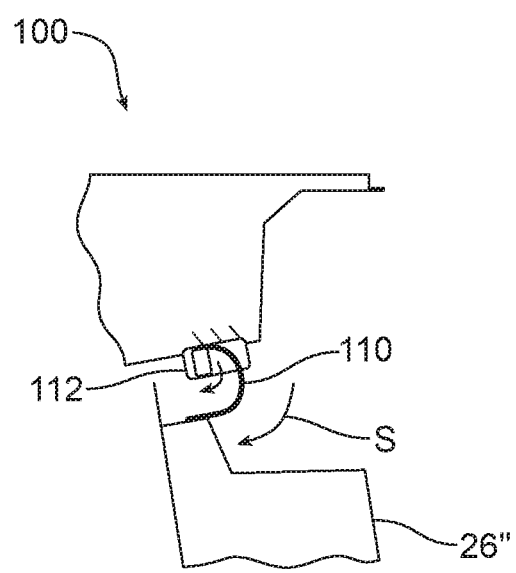
Figure 11:
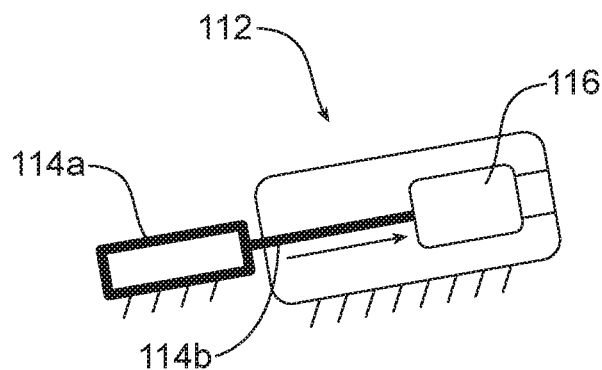
FIGS. 11-12 illustrate an actuator for the translatable hinge.
Figure 12:
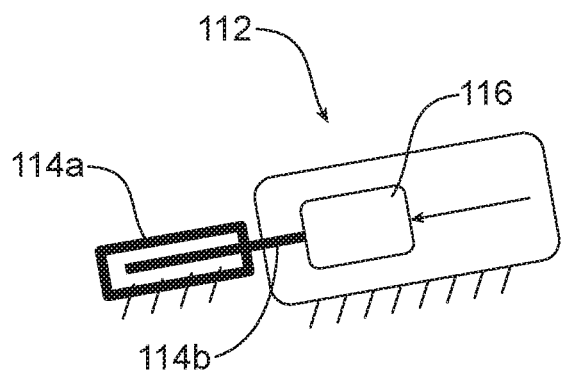
Figure 13:
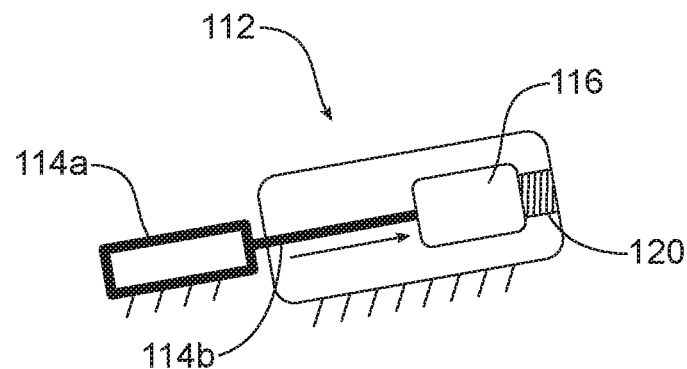
FIGS. 13-14 illustrate the optional use of a biasing member with the translatable hinge.

With continued reference to FIGS. 8-10, as well as FIGS. 11-13, the system 100 may further include a translatable hinge 110, such as for instance a gooseneck hinge, mounted for both translating and pivoting movement. Specifically, the hinge 110 may be affixed at one end to the door, such as rear door 26, and at the other end to an actuator 112 associated with the vehicle 20. As can be understood from FIGS. 13 and 14, each actuator 112 may include a linear actuator, such as a pressurized cylinder 114a with an extensible rod 114b for moving a support 116 for supporting the end of the hinge 110 associated with the vehicle 20. The orientation of the actuator 112 may be such that the movement of the rod 114b moves the hinge 110 and thus the door 26 both rearwardly and outboard of the vehicle 20, as indicated in FIG. 9, but it could also provide a purely linear movement depending on the particular geometry of the door 26 and vehicle 20.

Thus, as indicated in FIGS. 8 and 9, the door 26 may be first translated rearwardly relative to the travel direction D of the vehicle 20 and outboard of the vehicle in a direction transverse to the travel direction as a result of the movement of hinge 110 by the actuator 112 and the movement of latch 102 along the elongated striker bar 106a. During this movement, the single hinge axis 48 moves accordingly, such as from a first position (48 in FIG. 8) to a second position (48' in FIG. 9; see arrows R indicating combined rearward and outboard movement, generally opposite travel direction D). In the second position of the hinge axis 48", it can be appreciated that the rear door 26 has been separated from the front door 24 (and any associated seal 118), and thus can be swung to the fully open position (see arrow S, and as also shown in FIG. 3, but it can be understood that the illustration provided shows the doors 24, 26 on the opposite side of the vehicle 20). The other (front) door 24 may then be released and also moved to the open position to fully expose the interior compartment of the vehicle 20. Door 24 may then be closed, followed by movement of rear door 26 to the FIG. 9 position, at which point the hinge 110 may be actuated to return the rear door 26 to the closed and sealed position in opening 28.

In terms of the seal 118, it may also be appreciated that this arrangement allows for it to be positioned on either the front door 24 or the rear door 26, and thus forms a sealing engagement when the doors are closed as shown in FIG. 1. The movement of either door to the intermediate position, such as the rear door 26 in the FIG. 2 embodiment, would thus separate the doors 24, 26 from the seal 118. If the seal 118 is on the translating door (again, shown as rear door 26), it would be separated, cleared, and moved away as the door rotates to the open position, as shown in FIG. 3. If on the stationary door (front door 24 in the illustrated embodiment) during translation, then it would also be separated, cleared, and moved to an open position when the stationary door is opened, as shown in FIG. 4.

Figure 14:
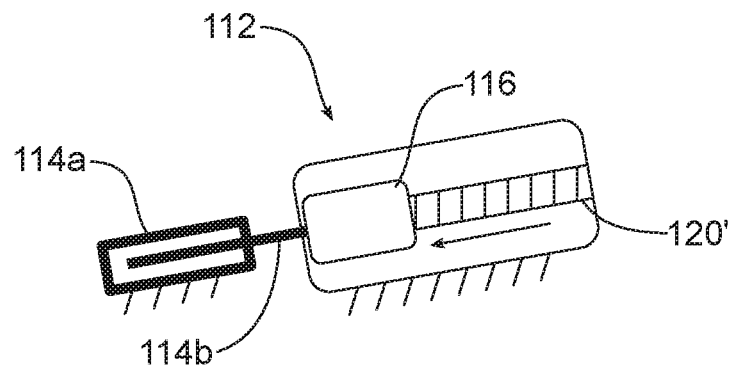

Referring to FIGS. 13 and 14, it is possible to associate a biasing member, such as a spring 120, with the support 116. In this manner, the spring 120 may expand (120' in FIG. 14) to assure the movement of the support 116 in the desired manner. Return of the support 116 to the position of FIG. 15 for closing the rear door 16 thus compresses the spring 120 and the resulting energy is stored for later use.

Figure 15:
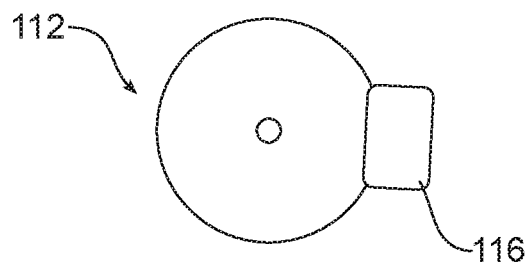
FIGS. 15-16 illustrate an alternate embodiment of the actuator for the translatable hinge.
Figure 16:
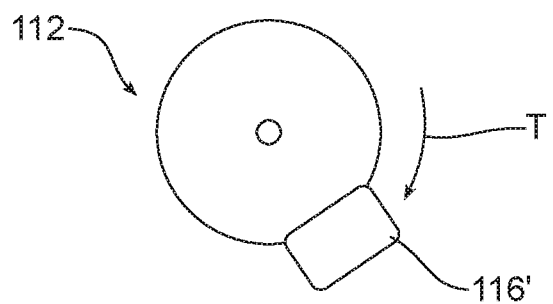

FIGS. 15 and 16 also illustrate that the actuator 112 may be non-linear. In particular, a rotary actuator 112, such as an electric motor, may be used to translate the support 116 from a first position associated with the closed door, to the open door (support position 116' in FIG. 16). As can be appreciated by arrow T, the resulting movement of the hinge 110 may be both in the rearward and outboard directions as a result of the movement of the support 116 along an arcuate path.

Figure 17:
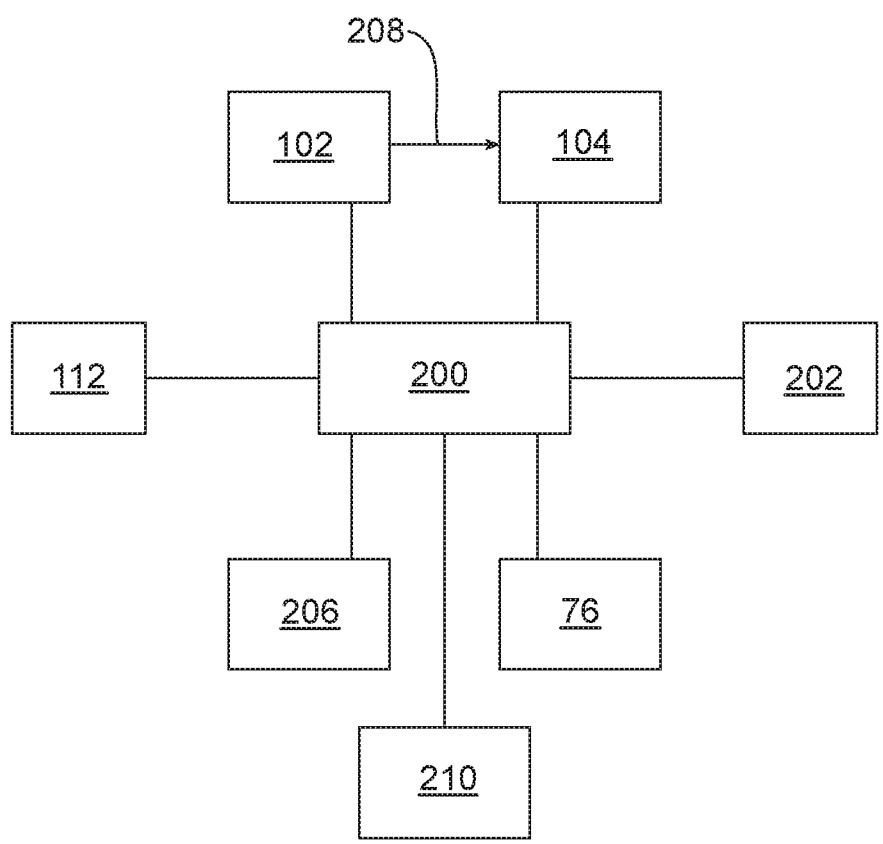
FIG. 17 is a schematic diagram illustrating a possible control arrangement for use in connection with the translatable hinge.

A possible arrangement for controlling the articulated hinge system 100 is illustrated in FIG. 17. The arrangement may include a controller 200 for electronically controlling the operation of one or both of the latches 102, 104 based on information received from a variety of sources, such as the door locks 202, an exterior door handle 76 (or an interior handle 78; see FIG. 4), or a vehicle movement or speed indicator 206 (which may be associated with the vehicle transmission). In one example, the controller 200 may lockout the release of the doors 24, 26 using any associated handle 76 when a locked condition is indicated or a remote control (key fob) is not present, or may activate the lower latch 104 to release upon engagement of the handle in an unlocked condition, thereby freeing the latch 102 to move along the striker 106 in the latched condition. Furthermore, the controller 200 may prevent delatching when the vehicle is in a gear for causing movement (forward, low, reverse, etc.), if it is determined that the vehicle speed is above a particular value (3 kilometers/hour), or alternatively, only allow delatching when the speed is below a particular value. The communication with the latches 102, 104 may be done in parallel or in series, as indicated by line 208. The controller 200 may also activate a light associated with the activated door, such as rear door 26 associated with translatable hinge 110, which can be used to provide illumination (and possibly a flashing signal) and indicate the outboard or open condition and thus help to alert others of the open condition.

As indicated, the controller 200 may also serve to cause the actuator 112 to cause the hinge 110 to move. This may be done upon an indication that the door handle 204 has been used to indicate that the latches 102, 104 should be released. Alternatively, the controller 200 may be instructed to translate the hinge 110 upon an indication that opening of the door(s) 24, 26 is desired (such as by a key fob or other remote indicator), at which point the handle(s) 76, 78 may be used to delatch the associated door (either manually or electronically).

In summary, an automotive vehicle 20 with a "pillarless" door opening 28 is provided with a translatable hinge 110 for connecting at least one of the doors 24, 26 in the opening to the vehicle. An actuator 112 for translating the hinge 110 may be provided such that a single pivot axis is provided, thereby simplifying the arrangement considerably, increasing reliability of operation, and reducing the expense of installation and maintenance. Upper and lower latches 102, 104 may be used to secure the door, shown as rear door 26, in place. The upper latch 102 may engage a modified striker 106 with an elongated, angled striker bar 106a that allows for movement of the associated door 26 away from the other door 24 (such as both rearwardly and outboard) while the latch 102 remains engaged during translation of the hinge 110. A controller 200 may also be provided for controlling the operation of the hinge 110 to permit release of the door 26 only under acceptable conditions (such as, for example, the unlocking of the doors, the engagement of the vehicle transmission, or movement above or below a particular rate), which may depend on the particular arrangement.

The foregoing description has been presented for purposes of illustration. It is not intended to be exhaustive or to limit the embodiments to the precise form disclosed. Obvious modifications and variations are possible in light of the above teachings. All such modifications and variations are within the scope of the appended claims when interpreted in accordance with the breadth to which they are fairly, legally and equitably entitled.

What is claimed:

1. An automotive vehicle having a body with an opening without a pillar, comprising:
   first and second doors for covering the opening; and
   a translatable hinge adapted for moving the first door away from the second door and for pivoting about a single pivot axis for opening the first door relative the second door;
   further including an actuator for moving the single pivot axis of the translatable hinge in a linear path of travel.

2. The vehicle of claim 1, further including a spring for biasing a translating support supporting the hinge toward a translated position.

3. The vehicle of claim 1, wherein the first door includes at least one latch, and further including a striker for allowing the latch to move along the striker in a latched condition during translation of the hinge.

4. The vehicle of claim 3, wherein the striker comprises an elongated striker bar for engaging the latch and being angled for permitting the first door to move both along and outboard of the vehicle body.

5. The vehicle of claim 1, wherein the first door includes an upper latch and a lower latch, and further including an upper striker for allowing the upper latch to move along the upper striker in a latched condition during translation of the hinge, and a lower striker for engaging the lower latch.

6. The vehicle of claim 5, wherein the upper striker comprises an elongated upper striker bar for engaging the upper latch, the elongated upper striker bar being angled outwardly for permitting the first door to move both along and outboard of the vehicle body.

7. The vehicle of claim 1, wherein the actuator comprises a rotary actuator for rotating a translating support supporting the translatable hinge in an arcuate path of travel.

8. The vehicle of claim 1, wherein the translatable hinge is adapted for moving such that one of the first or second doors moves outboard of the vehicle and away from the other door.

9. An automotive vehicle having a body with an opening, comprising:
   a first door for covering the opening and including a latch including a receiver;
   a hinge adapted for moving the first door relative to the opening; and
   a fixed striker for engaging the latch and passing into the receiver, the striker adapted for allowing the latch to move along the striker in a latched condition during translation of the hinge;
   further including an actuator for moving the translatable hinge along a linear path of travel, wherein the door includes a single pivot axis.

10. The vehicle of claim 9, further including a second door for covering the opening, wherein the first door and the second door cooperate to close the opening when both the first door and the second door are in a closed position, and the first door is translatable relative to the vehicle on a fixed path of translation such that the latch translates along the striker such that the first door is translated from the vehicle to an intermediate position for providing clearance from the second door when in the closed position, and the latch is detachable from the striker for pivoting the first door relative to the vehicle from the intermediate position to an open position of the first door.

11. The vehicle of claim 9, further including a spring for biasing a support supporting the translatable hinge toward a translated position.

12. The vehicle of claim 9, wherein the actuator comprises a rotary actuator for rotating a support supporting the translatable hinge in an arcuate path of travel.

13. The vehicle of claim 9, wherein the striker comprises an elongated striker bar for engaging the latch, the striker bar being angled for permitting the first door to move both along and outboard of the vehicle body.

14. The vehicle of claim 10, wherein the translatable hinge is adapted for moving such that one of the first or second doors moves outboard of the vehicle and away from the other door.

15. An automotive vehicle having a body with a vehicle body opening without a pillar for occupant ingress and egress, the vehicle comprising:
   a first door having a first end pivotally connected to the vehicle about an axis adjacent to a perimeter of the vehicle body opening, and a second end that extends to a central region of the opening in a closed position and that extends away from the opening in an open position;
   a second door having a first end translatably connected to the vehicle adjacent to the perimeter of the opening spaced apart from the first door first end, and a second end translatably connected to the vehicle adjacent to the central region of the opening at a closed position;

a fixed striker connected to one of the central region of the opening and the perimeter of the opening spaced apart from the first door end; and a latch mounted to one of the second door first end and the second door second end, the latch including a receiver for receiving the striker;

wherein the first door and the second door cooperate to close the opening when both the first door and the second door are in the closed position, and the second door is translatable relative to the vehicle on a fixed path of translation such that the latch translates along the fixed striker such that the second door first end and the second door second end are translated from the vehicle to an intermediate position for providing clearance from the first door when in the closed position, and the latch is detachable from the striker for pivoting the second door about the other of the second door first end and the second door second end relative to the vehicle from the intermediate position to an open position of the second door;

further including an actuator for moving the translatable hinge along a linear path of travel, wherein the door includes a single pivot axis.

16. The vehicle of claim 15, wherein the fixed striker comprises an elongated striker bar for engaging the latch, the striker bar being angled for permitting the first door to move both along and outboard of the vehicle body.

17. The vehicle of claim 15, wherein the second door is associated with a gooseneck hinge having a translatable hinge axis.

* * * * *